(12) United States Patent
Wolfe

(10) Patent No.: US 7,398,219 B1
(45) Date of Patent: Jul. 8, 2008

(54) SYSTEM AND METHOD FOR DISPLAYING MESSAGES USING A MESSAGES TABLE

(75) Inventor: Brian Wolfe, Austin, TX (US)

(73) Assignee: Computer Sciences Corporation, Austin, TX (US)

( * ) Notice: Subject to any disclaimer, the term of this patent is extended or adjusted under 35 U.S.C. 154(b) by 314 days.

(21) Appl. No.: 09/603,306

(22) Filed: Jun. 23, 2000

(51) Int. Cl.
G06Q 40/00 (2006.01)
G06F 17/30 (2006.01)

(52) U.S. Cl. ............................ 705/4; 707/3

(58) Field of Classification Search ........... 345/708, 345/218; 705/2, 8, 9, 7, 35, 38, 4, 42, 3, 705/1, 34, 36 R, 26, 39; 707/104.1, 4, 10, 707/3, 201; 704/8, 231; 717/106; 463/25; 709/203, 229, 206
See application file for complete search history.

(56) References Cited

U.S. PATENT DOCUMENTS

| | | | |
|---|---|---|---|
| 4,525,780 A | 6/1985 | Bratt et al. | 711/163 |
| 4,553,206 A | 11/1985 | Smutek et al. | |
| 4,648,062 A | 3/1987 | Johnson et al. | |
| 4,812,966 A | 3/1989 | Takagi et al. | |
| 4,831,526 A | 5/1989 | Luchs et al. | |
| 4,837,693 A | 6/1989 | Schotz | |
| 4,839,822 A | 6/1989 | Dormond et al. | |
| 4,878,167 A | 10/1989 | Kapulka et al. | |
| 4,964,077 A | 10/1990 | Eisen et al. | |
| 4,975,840 A | 12/1990 | DeTore et al. | |
| 4,987,538 A | 1/1991 | Johnson et al. | |
| 4,992,972 A | 2/1991 | Brooks et al. | |

(Continued)

FOREIGN PATENT DOCUMENTS

EP 0 280 773 9/1988

(Continued)

OTHER PUBLICATIONS

Medisoft Insurance Claims Software Website. May 10, 2000. [Retrieved on Jan. 10, 2003] Retrieved from Internet. URL: <http://web.archive.org/web/20000510094549/http://www.medisoft.com/>.*

(Continued)

*Primary Examiner*—C. Luke Gilligan
*Assistant Examiner*—Natalie A. Pass
(74) *Attorney, Agent, or Firm*—Meyertons, Hood, Kivlin, Kowert & Goetzel, P.C.; Eric B. Meyertons (57) ABSTRACT

An improved method and system to display messages, while processing insurance claims, using a messages table. The messages associated with the processing of insurance claims are primarily used to obtain inputs from the user of the claims processing computer system. Messages, which are typically displayed on a display screen, may include questions, answers, errors, warnings, and other text used with interactive claims processing. The messages are stored as message codes along with a corresponding message text in a messages table. The database, which includes the messages table is the repository and the lookup system for the message codes and the corresponding message texts. Each message code has a corresponding customizable message text, which may be specified at installation time. The application program requests display of specific messages by referring to its message code. The application program, thus, remains unaffected to changes in the corresponding customizable message texts.

46 Claims, 4 Drawing Sheets

U.S. PATENT DOCUMENTS

| | | | |
|---|---|---|---|
| 5,008,853 A | 4/1991 | Bly et al. ................... 715/751 | |
| 5,093,911 A | 3/1992 | Parks et al. | |
| 5,099,422 A | 3/1992 | Foresman et al. | |
| 5,155,806 A | 10/1992 | Hoeber et al. | |
| 5,157,768 A | 10/1992 | Hoeber et al. | |
| 5,170,464 A | 12/1992 | Hayes et al. ................ 706/60 | |
| 5,191,522 A | 3/1993 | Bosco et al. | |
| 5,201,044 A | 4/1993 | Frey, Jr. et al. | |
| 5,233,513 A | 8/1993 | Doyle | |
| 5,241,671 A | 8/1993 | Reed et al. | |
| 5,287,448 A | 2/1994 | Nicol et al. | |
| 5,307,262 A * | 4/1994 | Ertel ............................. 705/2 | |
| 5,307,265 A * | 4/1994 | Winans ........................ 704/8 | |
| 5,359,509 A | 10/1994 | Little et al. | |
| 5,359,660 A | 10/1994 | Clark et al. ................... 726/3 | |
| 5,386,566 A | 1/1995 | Hamanaka et al. | |
| 5,388,251 A | 2/1995 | Makino et al. | |
| 5,394,555 A | 2/1995 | Hunter et al. | |
| 5,432,904 A | 7/1995 | Wong | |
| 5,434,994 A | 7/1995 | Shaheen et al. | |
| 5,446,653 A | 8/1995 | Miller et al. | |
| 5,455,947 A | 10/1995 | Suzuki et al. | |
| 5,471,575 A | 11/1995 | Giansante | |
| 5,481,667 A | 1/1996 | Bieniek et al. | |
| 5,483,632 A | 1/1996 | Kuwamoto et al. .......... 345/708 | |
| 5,499,330 A | 3/1996 | Lucas et al. | |
| 5,504,674 A * | 4/1996 | Chen et al. ..................... 705/4 | |
| 5,504,675 A | 4/1996 | Cragun et al. | |
| 5,517,405 A | 5/1996 | McAndrew et al. | |
| 5,523,942 A | 6/1996 | Tyler et al. | |
| 5,535,323 A | 7/1996 | Miller et al. | |
| 5,537,315 A | 7/1996 | Mitcham | |
| 5,550,734 A | 8/1996 | Tarter et al. | |
| 5,550,976 A | 8/1996 | Henderson et al. | |
| 5,557,515 A * | 9/1996 | Abbruzzese et al. ........... 705/9 | |
| 5,586,310 A | 12/1996 | Sharman | |
| 5,613,072 A | 3/1997 | Hammond et al. | |
| 5,630,127 A | 5/1997 | Moore et al. ............ 707/103 R | |
| 5,638,508 A | 6/1997 | Kanai et al. | |
| 5,644,778 A * | 7/1997 | Burks et al. ..................... 705/2 | |
| 5,652,842 A | 7/1997 | Siegrist, Jr. et al. | |
| 5,655,085 A | 8/1997 | Ryan et al. | |
| 5,673,402 A | 9/1997 | Ryan et al. | |
| 5,689,706 A | 11/1997 | Rao et al. | |
| 5,704,044 A | 12/1997 | Tarter et al. | |
| 5,717,903 A | 2/1998 | Driscoll | |
| 5,732,221 A | 3/1998 | Feldon et al. | |
| 5,732,397 A | 3/1998 | DeTore et al. | |
| 5,745,901 A | 4/1998 | Entner | |
| 5,748,953 A | 5/1998 | Mizutani et al. | |
| 5,768,505 A | 6/1998 | Gilchrist et al. | |
| 5,768,506 A | 6/1998 | Randell | |
| 5,768,578 A | 6/1998 | Kirk et al. | |
| 5,797,134 A | 8/1998 | McMillan et al. | |
| 5,809,478 A | 9/1998 | Greco et al. ................... 705/4 | |
| 5,832,481 A | 11/1998 | Sheffield ....................... 707/4 | |
| 5,832,530 A | 11/1998 | Paknad et al. | |
| 5,835,897 A | 11/1998 | Dang | |
| 5,835,914 A | 11/1998 | Brim | |
| 5,850,442 A | 12/1998 | Muftic | |
| 5,862,325 A | 1/1999 | Reed et al. | |
| 5,870,711 A * | 2/1999 | Huffman ....................... 705/8 | |
| 5,873,066 A | 2/1999 | Underwood et al. | |
| 5,884,274 A | 3/1999 | Walker et al. | |
| 5,895,461 A | 4/1999 | De La Huerga et al. | |
| 5,899,998 A * | 5/1999 | McGauley et al. ....... 707/104.1 | |
| 5,903,873 A | 5/1999 | Peterson et al. | |
| 5,907,848 A | 5/1999 | Zaiken et al. | |
| 5,909,683 A | 6/1999 | Miginiac et al. | |
| 5,913,198 A | 6/1999 | Banks | |
| 5,914,714 A | 6/1999 | Brown | |
| 5,915,241 A | 6/1999 | Giannini | |
| 5,918,208 A | 6/1999 | Javitt | |
| 5,930,759 A | 7/1999 | Moore et al. | |
| 5,933,816 A | 8/1999 | Zeanah et al. | |
| 5,937,189 A | 8/1999 | Branson et al. | |
| 5,950,169 A | 9/1999 | Borghesi | |
| 5,950,196 A | 9/1999 | Pyreddy et al. | |
| 5,956,687 A * | 9/1999 | Wamsley et al. ................ 705/1 | |
| 5,956,691 A | 9/1999 | Powers | |
| 5,963,952 A | 10/1999 | Smith | |
| 5,970,464 A | 10/1999 | Apte et al. | |
| 5,982,369 A | 11/1999 | Sciammarella et al. ...... 715/835 | |
| 5,987,430 A | 11/1999 | Van Horne et al. | |
| 5,987,434 A | 11/1999 | Libman | |
| 5,987,440 A | 11/1999 | O'Neil et al. ................. 705/44 | |
| 5,991,733 A | 11/1999 | Aleia et al. | |
| 5,991,756 A | 11/1999 | Wu | |
| 5,995,947 A | 11/1999 | Fraser et al. | |
| 5,999,940 A | 12/1999 | Ranger | |
| 6,003,007 A * | 12/1999 | DiRienzo ....................... 705/4 | |
| 6,003,011 A * | 12/1999 | Sarin et al. .................... 705/9 | |
| 6,012,053 A | 1/2000 | Pant et al. | |
| 6,016,477 A | 1/2000 | Ehnebuske et al. ............. 705/7 | |
| 6,016,504 A | 1/2000 | Arnold et al. | |
| 6,029,150 A | 2/2000 | Kravitz | |
| 6,029,195 A | 2/2000 | Herz | |
| 6,038,393 A | 3/2000 | Iyengar et al. | |
| 6,038,668 A | 3/2000 | Chipman et al. | |
| 6,049,665 A | 4/2000 | Branson et al. | |
| 6,061,657 A | 5/2000 | Whiting-O'Keefe | |
| 6,064,983 A | 5/2000 | Koehler | |
| 6,065,000 A | 5/2000 | Jensen | |
| 6,065,047 A | 5/2000 | Carpenter et al. | |
| 6,073,104 A | 6/2000 | Field | |
| 6,081,832 A | 6/2000 | Gilchrist et al. | |
| 6,088,702 A | 7/2000 | Plantz et al. ............ 707/103 R | |
| 6,088,710 A | 7/2000 | Dreyer et al. | |
| 6,092,049 A | 7/2000 | Chislenko et al. | |
| 6,098,070 A | 8/2000 | Maxwell | |
| 6,105,007 A | 8/2000 | Norris | |
| 6,112,986 A | 9/2000 | Berger et al. | |
| 6,115,690 A | 9/2000 | Wong | |
| 6,119,093 A | 9/2000 | Walker et al. | |
| 6,128,598 A | 10/2000 | Walker et al. | |
| 6,134,582 A | 10/2000 | Kennedy | |
| 6,148,297 A | 11/2000 | Swor et al. | |
| 6,163,770 A * | 12/2000 | Gamble et al. ................. 705/4 | |
| 6,185,540 B1 | 2/2001 | Schreitmueller et al. | |
| 6,202,054 B1 | 3/2001 | Lawlor et al. | |
| 6,208,973 B1 | 3/2001 | Boyer et al. | |
| 6,226,623 B1 | 5/2001 | Schein et al. | |
| 6,236,972 B1 | 5/2001 | Shkedy | |
| 6,236,975 B1 | 5/2001 | Boe et al. | |
| 6,237,035 B1 | 5/2001 | Himmel et al. | |
| 6,239,798 B1 | 5/2001 | Ludolph et al. | |
| 6,253,203 B1 | 6/2001 | O'Flaherty et al. ............. 707/9 | |
| 6,266,645 B1 | 7/2001 | Simpson | |
| 6,272,471 B1 | 8/2001 | Segal | |
| 6,272,482 B1 | 8/2001 | McKee et al. | |
| 6,272,528 B1 | 8/2001 | Cullen et al. | |
| 6,314,419 B1 | 11/2001 | Faisal | |
| 6,330,551 B1 | 12/2001 | Burchetta et al. | |
| 6,336,096 B1 | 1/2002 | Jernberg | |
| 6,341,265 B1* | 1/2002 | Provost et al. ................. 705/4 | |
| 6,343,271 B1 | 1/2002 | Peterson et al. | |
| 6,370,511 B1 | 4/2002 | Dang | |
| 6,401,079 B1 | 6/2002 | Kahn et al. | |
| 6,449,652 B1 | 9/2002 | Blumenau et al. ........... 709/229 | |
| 6,456,303 B1 | 9/2002 | Walden et al. | |
| 6,467,081 B2 | 10/2002 | Vaidyanathan et al. ...... 717/123 | |
| 6,473,748 B1 | 10/2002 | Archer ........................ 706/45 | |
| 6,477,533 B2 | 11/2002 | Schiff et al. | |
| 6,480,956 B1 | 11/2002 | DiRienzo | |

| | | | |
|---|---|---|---|
| 6,484,178 B1 | 11/2002 | Bence, Jr. et al. | |
| 6,584,467 B1 | 6/2003 | Haught et al. | |
| 6,594,697 B1 | 7/2003 | Praitis et al. | |
| 6,609,200 B2 | 8/2003 | Anderson | 713/176 |
| 6,636,242 B2 | 10/2003 | Bowman-Amuah | 715/764 |
| 6,643,652 B2 | 11/2003 | Helgeson et al. | 707/10 |
| 6,658,568 B1 | 12/2003 | Ginter et al. | 713/193 |
| 6,810,382 B1 | 10/2004 | Wamsley et al. | 705/1 |
| 2001/0041993 A1* | 11/2001 | Campbell | 705/4 |
| 2002/0002475 A1* | 1/2002 | Freedman et al. | 705/4 |
| 2002/0022976 A1 | 2/2002 | Hartigan | |
| 2002/0116228 A1 | 8/2002 | Bauer et al. | |
| 2002/0147617 A1 | 10/2002 | Schoenbaum et al. | |

FOREIGN PATENT DOCUMENTS

| | | |
|---|---|---|
| EP | 0 465 018 | 1/1992 |
| EP | 0 926 608 | 6/1999 |

OTHER PUBLICATIONS

Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, Vol. I, No. 3, The Continuum Company, Inc., Mar./Apr. 1992, 16 pages.
Continuum Connections, vol. I, No. 4, The Continuum Company, Inc. Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, Vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation. Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
"The Continuum Company Announces Colossus™ Licenses," Continuum Financial News Release, The Continuum Company, Inc., Apr. 7, 1995, 1 page.
"The Continuum Company Announces Colossus License," Continuum Financial News Release, The Continuum Company, Inc., Jul. 13, 1995, 1 page.
"The Continuum Company Announces Colossus License," Continuum Financial News Release, The Continuum Company, Inc., Jul. 17, 1995, 1 page.
"The Continuum Company Announces Colossus™ Sale," Continuum Financial News Release, The Continuum Company, Inc., Oct. 9, 1995, 1 page.
"The Continuum Company Announces Colossus™ Sale To General Accident," Continuum Financial News Release, The Continuum Company, Inc., Nov. 7, 1995, 1 page.
"The Continuum Company Announces Second European Colossus Sale," Continuum Financial News Release, The Continuum Company, Inc., Jan. 5, 1996, 1 page.
"The Continuum Company Announces Colossus™ Sale," Continuum Financial News Release, The Continuum Company, Inc., Mar. 7, 1996, 1 page.
"The Continuum Company Announces Colossus License," Continuum Financial News Release, The Continuum Company, Inc., May 9, 1996, 2 pages.
"The Continuum Company Announces Colossus Sale," Continuum Financial News Release, The Continuum Company, Inc., Jun. 12, 1996, 2 pages.
"The Continuum Company Announces Colossus Sale," Continuum Financial News Release, The Continuum Company, Inc., Jul. 3, 1996, 1 page.
"CSC Continuum Announces Colossus Sale," News Release, Computer Sciences Corporation, Sep. 17, 1996, 2 pages.
"CSC Continuum Announces Colossus License," News Release, Computer Sciences Corporation, Sep. 17, 1996, 2 pages.
"CSC Continuum Announces Colossus™ License," News Release, CSC Continuum, Nov. 21, 1996, 2 pages.
"USAA Licenses Colossus™ ," News Release, CSC Continuum, Feb. 10, 1997, 2 pages.

"20th Century Industries Licenses Colossus™," News Release, CSC Continuum, Feb. 10, 1997, 2 pages.

"Arrow Claims Management Licenses Colossus™," News Release, Computer Sciences Corporation, Aug. 6, 1997, 2 pages.

"American Family Insurance Renews Colossus™ License," News, Release, Computer Sciences Corporation, Dec. 8, 1997, 2 pages.

"Explorer Insurance Company Licenses Colossus™," News Release, Computer Sciences Corporation, Dec. 8, 1997, 2 pages.

Greenleaf, Graham, A Colossus come to judgement: GIO's expert system on general damages, University of New South Wales (published in the Law & Information Technology column, Australian Law Journal) Nov. 26, 1992, 6 pages.

Beinat, Paul, Artificial intelligence helps boost Australian profits, Property-Casualty Insurance Edition Apr. 1997, vol. 97, Issue 12, p. 22, 2/3 p.

Attrino, Tony, Software helps bolster claims assessment, National Underwriter/ Property & Casualty Risk & Benefits, May 4, 1998, vol. 102, Issue 18, p. 14, 2p.

Colossus'—A claims management system, creates standard for measuring pain/ suffering claims, Insurance Advocate, May 8, 1999, vol. 110, Issue 19, p. 25, 1/4 p.

Schwartz, Susana, CSC wraps traditional insurance solutions into a neat new package, Insurance and Technology, Sep. 1998, vol. 23, Issue 9, p. 61, 2p.

Bremer, Christine, and Lance Trollop, Colossus: What Colossus is and what it does, accessed at http://www.watl.org. Verdict%20articles/colossus.htm on May 6, 2004.

International search report application number PCT/US 01/ 20030, mailed Nov. 1, 2001, 5 pages.

"@ Fault A Commitment to Consistency," Computer Sciences Corporation, Copyright 2000, pp. 1-2.

Borland, Russel; "Running Microsoft Outlook 97," Microsoft Press, 1997.

Howarth, "Outsourcing: Technology on Tap," Business Review Weekly, Dec. 1999, pp. 1-5.

"The OTC Revolution"; Juhl, Randy; Mar. 3, 1997, Drug Topics 141 (5).

Mead, Jay, "Measuring the Value Added by Technical Documentation" Technical Communication Online, Aug. 1998, V. 45, N. 3.

Merlin, Jr., William F., "Collision Course With the Colossus Program: How To Deal With It," The Merlin Law Group, May 2000, Tampa, FL, pp.1-17.

Merlin, Jr., William F., "Overcoming Allstate's Trade Secrets and Work-Product Objections," The Merlin Law Group, May 2000, Tampa, FL, pp.1-31.

Microsoft Press Computer Dictionary Second Edition, Microsoft Press, 1994, pp. 26-27, 117, 277,335, 338, 353, 366-367, and 383.

Merlin, Jr., William F., "Colossus: What We Know Today," The Merlin Law Group, Aug. 2000, Tampa, FL, pp. 1-8.

https://www.foremost.com/secure/fm_claims.htm 1996.

Summary of Colossus Functionality as of Dec. 1999.

Scopus and Entrust Technologies to Deliver World's First Secure Customer Care Solution for the Financial Services Market; PR Newswire dated Nov. 5, 1997.

Scopus and Entrust: Call Center Sales Center is Unveiled; American Banker, Nov. 10. 1997, vol. 162, Issue 217.

Allstate Creates New Customer Care Center Internet Service, Apr. 13, 1999, accessed at www.allstate.com/media/newshedlines.

Allstate Announces Online Claim Reporting Capabillities, Sep. 13, 1999, accessed at www.allstate.com/media/newsheadlines.

U.S. Appl. No. 09/603,307 (5053-27600).
U.S. Appl. No. 09/603,129 (5053-27700).
U.S. Appl. No. 09/603,308 (5053-27900).
U.S. Appl. No. 09/603,144 (5053-28000).
U.S. Appl. No. 09/602,687 (5053-28100).
U.S. Appl. No. 09/603,662 (5053-27800).
U.S. Appl. No. 09/603,302 (5053-35700)*—Claims Only, Specification and Figures are similar to U.S. Appl. No. 09/603,662 (5053-27800).
U.S. Appl. No. 09/602,691 (5053-35800)*—Claims Only, Specification and Figures are similar to U.S. Appl. No. 09/603,662 (5053-27800).
U.S. Appl. No. 09/603,130 (5053-35900).
U.S. Appl. No. 09/603,303 (5053-36000).
U.S. Appl. No. 09/603,304 (5053-36100).
U.S. Appl. No. 10/285,292 (5053-57800).
U.S. Appl. No. 10/285,289 (5053-57801)*—Claims Only, Specification and Figures are similar to U.S. Appl. No. 10/285,292 (5053-57800).
U.S. Appl. No. 10/285,339 (5053-57802)*—Claims Only, Specification and Figures are similar to U.S. Appl. No. 10/285,292 (5053-57800).
U.S. Appl. No. 10/285,375 (5053-57803)*—Claims Only, Specification and Figures are similar to U.S. Appl. No. 10/285,292 (5053-57800).
U.S. Appl. No. 10/285,338 (5053-57804)*—Claims Only, Specification and Figures are similar to U.S. Appl. No. 10/285,292 (5053-57800).
U.S. Appl. No. 10/285,293 (5053-57805)*—Claims Only, Specification and Figures are similar to U.S. Appl. No. 10/285,292 (5053-57800).
U.S. Appl. No. 10/422,632 (5053-6300).
U.S. Appl. No. 10/422,450 (5053-63100)*—Claims Only, Specification and Figures are similar to U.S. Appl. No. 10/422,632 (5053-63000).

Australian patent application 2001268693—Examiner's first report on patent application, Apr. 21, 2006.

http://web.archive.org/web/20000605062238/http://www.wawanesa.com/insure_claims_process.htm, (Wawanesa Insurance) Jun. 5, 2000.

Microsoft Press Computer Dictionary 2nd Edition, Microsoft Press, Redmond WA, 1994.

"High-Performance Communication Networks"; Jean Walrand and Pravin Varaiya; 1996; pp. 361-369; Morgan Kaufmann Publishers.

"Will your Business Model Float?"; Baatz, E.B.; Webmaster Magazine; Oct. 1996; http://www.cio.com/archive/webbusiness/100196_float_content.html.

"InsWeb Teams Up with Online Resources; Deal brings online insurance Marketplace to hundreds of financial institutions"; Dec. 2, 1998; pp. 1-3; Business Wire.

"Reliance Group providing On-Line Access to Workers' Comp, Auto, Surety, Professional Liability Coverages; E-Commerce to Exceed $100 Million in 1999"; Dec. 7, 1998; pp. 1-3; Business Wire.

Banking Flows Onto Net, Two Austin Software Companies Poised for Boom in Online Service; Ladendorf, Kirk; Dec. 14, 1998; pp. 1-5; Austin American Statesman.

"Time and Billing Gets Webbed"; Antoinette, Alexander; Jun. 1, 2000; pp. 46-50; Accounting Technology, vol. 16, No. 5.

Utzschneider, "Microsoft Transaction Server and Internet Information Server: Technology for the Web," Feb. 6, 1998, pp. 1-6.

Microsoft Corporation, "Holding State in Objects with Microsoft Transaction Server," Jun. 1997, pp. 1-3.

Microsoft Corporation, "Microsoft Component Services, Server Operating System, A Technology Overview," Aug. 15, 1998, pp. 1-7.

* cited by examiner

SYSTEM AND METHOD FOR DISPLAYING MESSAGES USING A MESSAGES TABLE

BACKGROUND OF THE INVENTION

1. Field of the Invention

The present invention generally relates to the field of insurance claims. More particularly, the present invention relates to a system and method for displaying messages while processing insurance claims using a messages table.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

The processing of insurance claims, especially bodily injury related insurance claims, is typically performed by one or more computers included in a computer system. The user typically interacts with the insurance claim processing computer system using a computer coupled to a display terminal and a keyboard. An application software program, which typically executes on a computer linked to the insurance claim processing computer system, provides the functionality to perform the processing of insurance claims. The process of determining an estimated amount of the claim associated with a bodily injury is typically interactive. The user may provide inputs to the insurance claim processing computer system by specifying the type or extent of bodily injury, describing the nature of treatments, etc.

The insurance claim processing computer system may use various messages displayed on the display terminal for prompting or communicating with the user to provide meaningful and relevant input information. Messages may also be used to advise user of a status or condition of application program, list of missing inputs, warning or error messages, etc. In some cases, messages may be output to a printer rather than being displayed on a display screen.

During the past several years, many insurance companies have been using an earlier computer-based claim-processing system to process, evaluate, analyze or estimate thousands of claims. The computer-based claim-processing system may also be an expert system which utilizes and builds a knowledge base to assist the user in decision making. It may allow the insurance companies to define new rules and/or use previously defined rules, in real-time. The business rules may be generally written by industry experts to evaluate legal, medical, insurance conditions before arriving at a valuation of a claim. The computer based claim-processing system also used messages displayed on a screen to interact with the system user.

There were several drawbacks with the earlier computer-based system. For example, the messages that were generated while processing the insurance claim, used in the prior art, lacked flexibility and was inefficient. The prior art used hard-coded messages. That is, the actual messages, including the message text, were part of the application program source code. Messages were generated specific to the context of the application program. Thus, many messages which may have had the same text or message content had to be programmed and stored separately and could not be re-used. This increased memory requirements and decreased system performance. In addition, it was difficult to modify and install the application software for use in other countries, which used a language other than, for example, US English. Maintenance of the messages hard-coded in the application program software was also time consuming and costly. This reduced the user's flexibility and usability.

It is, therefore, desirable to develop a new system and method for displaying messages while processing insurance claims using a messages table. It is desirable for the display of messages, including the message text, to be easily customizable for installation in a specific language and/or country. It is also desirable for the messages to be re-used throughout the claims processing application software. Furthermore, it is desirable to be able to store the messages in a repository, external to the application program. Thus, the messages display system and method should be of a flexible design to allow the user to freely select message text based on user requirements.

SUMMARY OF THE INVENTION

The present invention provides various embodiments of an improved method and system to display messages, while processing insurance claims, using a messages table. The messages associated with the processing of insurance claims are primarily used to obtain inputs from the user of the claims processing computer system. Messages, which are typically displayed on a display screen, may include questions, answers, errors, warnings, and other text used with interactive claims processing.

As a part of the initial configuration or setup process, the user defines the entries in the messages table and stores them in a database. The messages are stored as message codes along with a corresponding message text in a messages table. The database, which includes the messages table is the repository and the lookup system for the message codes and the corresponding message texts. Each message code has a corresponding customizable message text, which may be specified at installation time.

The application program may request a display of a specific message by providing its message code. In one embodiment, the GetMessageText method of the Message object, may be invoked, along with providing the values for MsgSectionIn and MsgCodeIn arguments associated with the GetMessageText method. The GetMessageText method, on execution, accesses the messages table and obtains the corresponding message text which is then passed on to the requesting application program. The application program, thus, remains unaffected to changes in corresponding customizable message texts.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 1A:
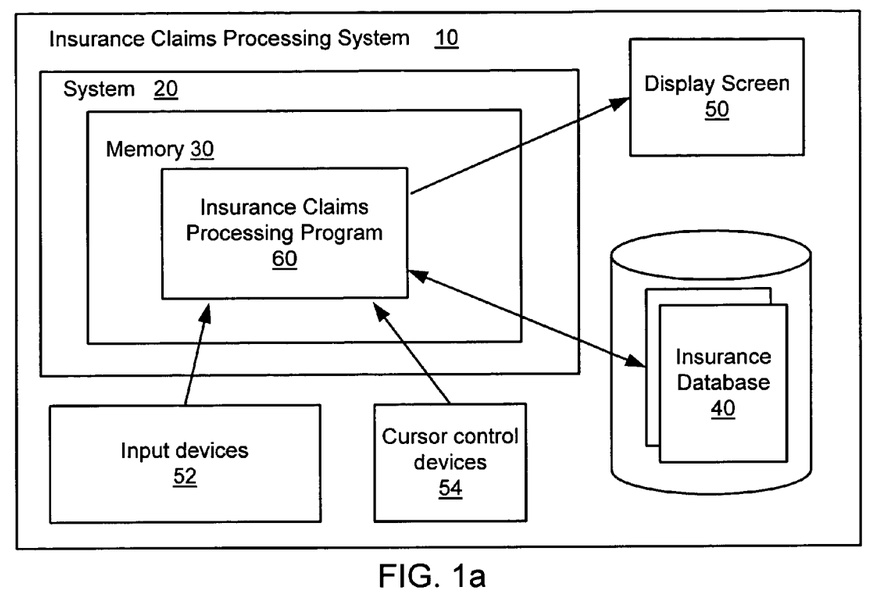
FIG. 1a is a block diagram illustrating the architecture of one embodiment of an insurance claims processing system.

FIG. 1a: A Block Diagram Illustrating the Architecture of One Embodiment of an Insurance Claims Processing System In FIG. 1a, an embodiment of an insurance claims processing system 10 may include a computer system 20. The term "computer system" as used herein generally includes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium.

The memory medium preferably stores a software program or programs for processing insurance claims as described herein. The software program(s) may be implemented in any of various ways, including procedure-based techniques, component-based techniques, and/or object-oriented techniques, among others. For example, the software programs may be implemented using a rule-based development tool such as PLATINUM Aion™ available from Computer Associates International, Inc. In one embodiment, PLATINUM Aion™ may combine business rule and object-oriented technologies to create and maintain complex, knowledge-intensive applications. Software developed with PLATINUM Aion™ may employ an Aion™ programming language for automation of processes which may use hundreds or thousands of business rules from a knowledge base. An Aion™ inference engine may automatically determine which rules to execute, when, and in what order. In various other embodiments, the software program may be implemented using other technologies, languages, or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

The insurance claims processing system 10 may further include a display screen 50 connected to the computer system 20 and an insurance database 40 residing on an internal or external storage. The database may also be referred to as a repository. As used herein, a "database" may include a collection of information from which a computer program may select a desired piece of data. As used herein, an "insurance database" is used as a synonym for a "database" when included in or coupled to an insurance claims processing system 10. System 20 includes memory 30 configured to store computer programs for execution on system 20, and a central processing unit (not shown) configured to execute instructions of computer programs residing on system 20. Claims processing program 60, also referred to as application program software 60, may be stored in memory 30. As used herein, an "insurance claims processing program" 60 may include a software program which is configured to conduct transactions regarding insurance claims, such as by estimating the value of the insurance claims, for example.

The insurance claims processing system 10 may be used by an Insurance Company for processing insurance claims. The insurance claims processing system 10 may incorporate various embodiments of a system and method for displaying messages using a messages table. As used herein, an Insurance Company (IC) includes a business organization that provides insurance products and/or services to customers. More particularly, the insurance products may pertain to providing insurance coverage for accidents and the trauma-induced bodily injuries that may result due to the accident. Examples of trauma-induced bodily injuries may include, but are not limited to: loss of limb(s); bone fractures; head, neck and/or spinal injury, etc.

In one embodiment, on receiving a trauma-induced bodily injury, a customer may file an insurance claim with his/her insurance organization to cover medical and other accident-related expenses. An IC may utilize a computer-based insurance claim processing system to process insurance claims. In one embodiment, the processing may include estimating a value associated with the filed insurance claim.

As used herein, an IC business transaction may be defined as a service of an IC. Examples of business transactions include, but are not limited to: insurance transactions such as filing of claims, payment of claims, application for insurance coverage, and customized benefits, etc. Business transactions may also include services related to customers, insurance providers, employers, insurance agents, investigators, etc.

As used herein, an IC insurance claim processing includes a series of instructions executed by a computer system for processing an IC's business transactions. A claim processing system may include one or more processing tasks. A processing task may include a sequence of one or more processing steps or an ordered list or a structured list of one or more processing steps, associated with the business transaction to be processed by the claim processing system. In one embodiment, the sequence of steps may be fixed. In another embodiment the sequence of steps may be established dynamically, in real-time. In one embodiment, the sequence of one or more steps may include an initial step, a final step, one or more intermediary steps, etc. In one embodiment, an IC user may select steps to process an insurance claim in a sequential manner. In another embodiment, the IC user may select steps to process an insurance claim in a random or arbitrary manner. Examples of processing steps may include, but are not limited to: receiving an input from a user of the IC insurance claim processing system, reading a value from a database, updating a field in a database, displaying the results of a business transaction on a computer screen, etc.

In one embodiment, each processing step may have one or more associated messages. The primary purpose of these messages may be to display additional information related to the current step, solicit a user input, advise user of the current status of the processing step, etc. For example, messages displayed may advise the user to provide an input response to a specific question. In another instance, a message may warn the user of an out-of-range input value.

In one embodiment, the insurance claim processing system utilizes object-oriented technology to process transactions and store information related to insurance claims, including messages. In another embodiment, processing of transactions and storage of information related to insurance claims may utilize traditional programming languages and databases to achieve the same result. This would include processing and storage of messages.

The insurance claim processing system may utilize insurance objects, which may be defined to represent or model real-world business features of insurance products and services. This includes a message object to represent messages related to claim processing. Examples of insurance objects may include, but are not limited to, objects representing the following: an insurance claim; an accident report; a settlement; an estimated claim; IC service facilities, customers, and employees; business process such as a new insurance application and calculation of a premium; interfaces to external insurance organizations; work tasks such as calculations, decisions, and assignments; temporal objects such as calendars, schedulers, and timers; and elemental data necessary to accomplish work tasks such as messages, medical costs, risk factors, etc.

An insurance object, such as a message object, may be represented on the computer screen by a graphical icon or by a display listing the properties of the insurance object in graphic and alphanumeric format. An insurance claim object may be configured to gather and evaluate data for processing a filed insurance claim and to automatically make decisions about the insurance claim. The one or more processing steps associated with the processing of an insurance claim may also be configured as one or more processing step objects. In one embodiment, a display screen may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing insurance claims. In one embodiment, the starting point for processing insurance claims may include acquiring an insurance claim identification number from an IC system user.

In one embodiment, the messages associated with a display screen may be represented as a message object. A message object may also have methods and properties associated with it. In one embodiment, during the processing of an insurance claim, a business rule may determine that the insurance claim processing needs the input of a user to continue the processing of the claim. The insurance claim processing software may invoke a method of a message object to display a message to the IC system user.

In one embodiment, upon startup, the program 60 may provide a graphical user interface to display claims processing related information, including messages, on display screen 50. It may collect user inputs, entered by using user input devices 52 in response to one or more messages displayed on display screen 50, and associated with insurance claims. It may process the user inputs, access an insurance database 40, use the contents of the insurance database 40 to estimate the insurance claim, and store it in memory 30 and/or insurance database 40. The program 60 may display a value of the estimated insurance claim on display screen 50. A user may view the display of the estimated insurance claim on display screen 50, and may interactively make modifications, additions, and deletions to the estimated insurance claim.

System 20 may also include one or more user input devices 52, such as a keyboard, for entering data and commands into the insurance claim program 60. It may also include one or more cursor control devices 54 such as a mouse for using a cursor to modify an insurance claim viewed on display screen 50. In response to the displaying of messages related to the insurance claim, the insurance claim program 60 processing steps may be modified, updated and stored in the insurance database 40.

Figure 1B:
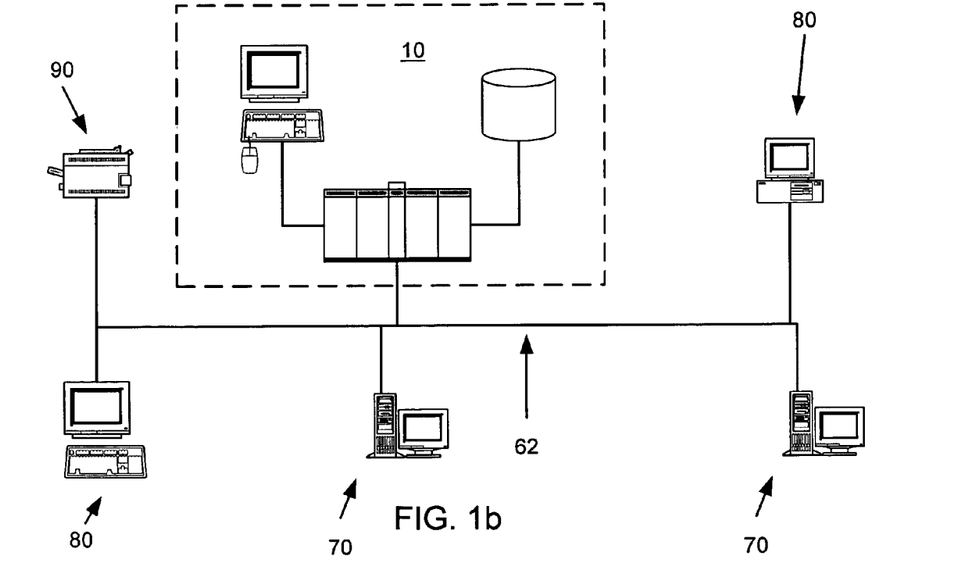
FIG. 1b illustrates one embodiment of a networked insurance claim processing system.

FIG. 1*b*: One Embodiment of a Networked Insurance Claim Processing System

FIG. 1*b* illustrates one embodiment of a networked system, configured for processing insurance claims. In this embodiment, the system is shown as a client/server system with the server systems and client systems connected by a network 62. Network 62 may be a local area network or wide area network, and may include communications links including, but not limited to: Ethernet, token ring, internet, satellite, and modem. Insurance claims processing system 10 as illustrated in FIG. 1*a* may be connected to network 62. The insurance claim processing system software and insurance database 40 may be distributed among the one or more servers 70 to provide a distributed processing system for insurance claim transactions. In other words, an insurance claim processing transaction being processed by the insurance claim processing system may be routed to any server based upon the workload distribution among servers 70 at the time of the transaction. Insurance claim processing system servers 70 may be located on a local area network or may be geographically dispersed in a wide area network.

One or more client systems 80 may also be connected to network 62. Client systems 80 may reside at one or more claim processing units within the insurance company. In a wide area network, client systems 80 may be geographically dispersed. Client systems 80 may be used to access insurance claim processing system servers 70 and insurance database 40. An insurance claim-processing employee may use a client system 80 to access the insurance claim processing system and execute insurance transactions. An employee may also use a client system 80 to interact with the insurance claim processing system. The interaction may include reading information from displays, messages, etc. displayed on a display screen and/or providing inputs to the insurance claim processing system. One or more printers 90 may also be connected to network 62 for printing documents, including reports, display screens, messages, etc. associated with insurance claim transactions.

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as networks and/or a wireless link.

Figure 2:
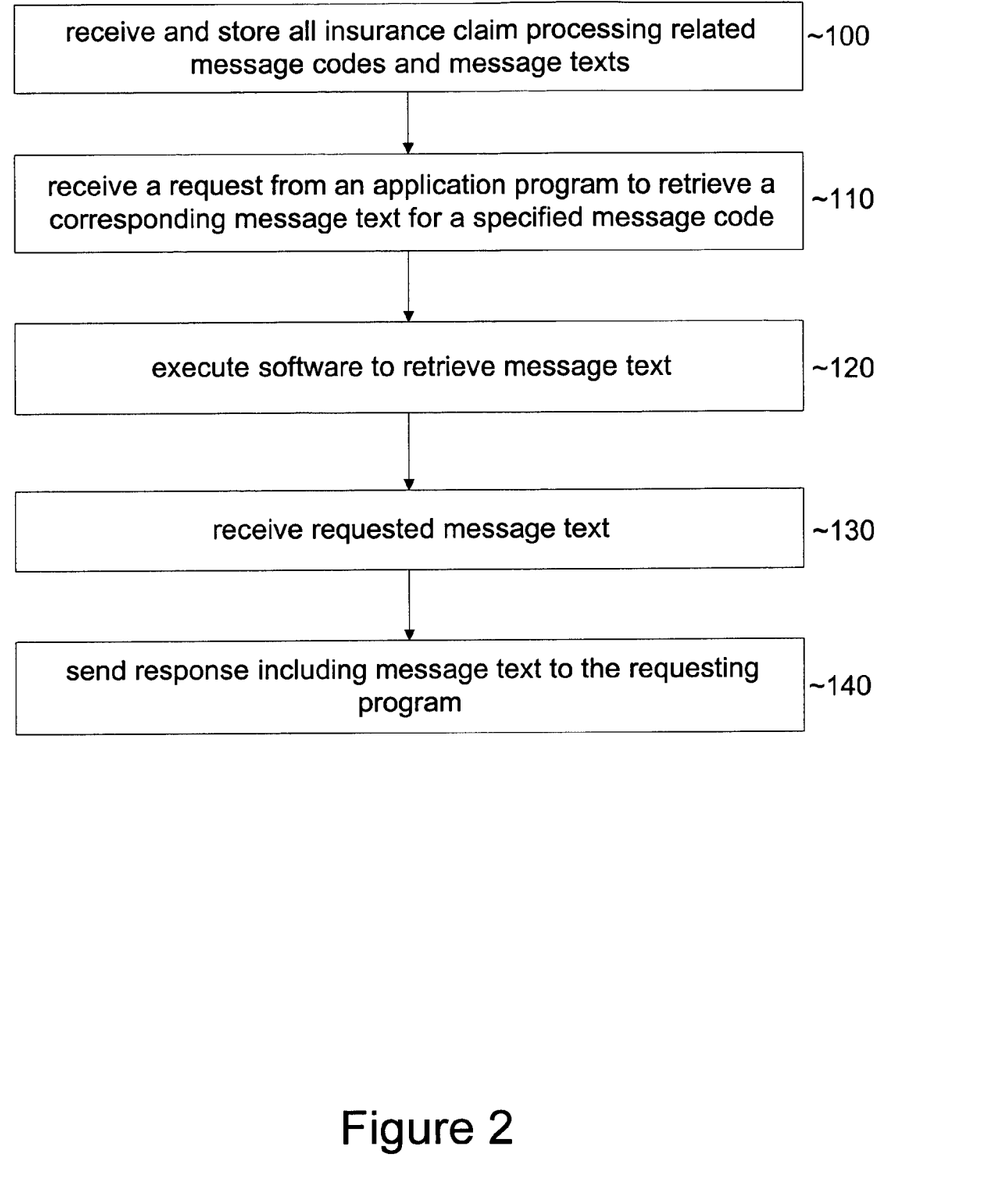
FIG. 2 is a flowchart illustrating a method of generating messages associated with processing an insurance claim according to one embodiment.

FIG. 2: Generating a Message for an Insurance Claim Processing System

FIG. 2 is a flowchart illustrating the generation of a message for processing an insurance claim by an insurance claim processing system, according to one embodiment. In step 100, the user of insurance claims processing system 10 may use a client system 80 to initially configure, set up, install and store the software associated with the insurance claims processing system, including all the messages.

Figure 3:
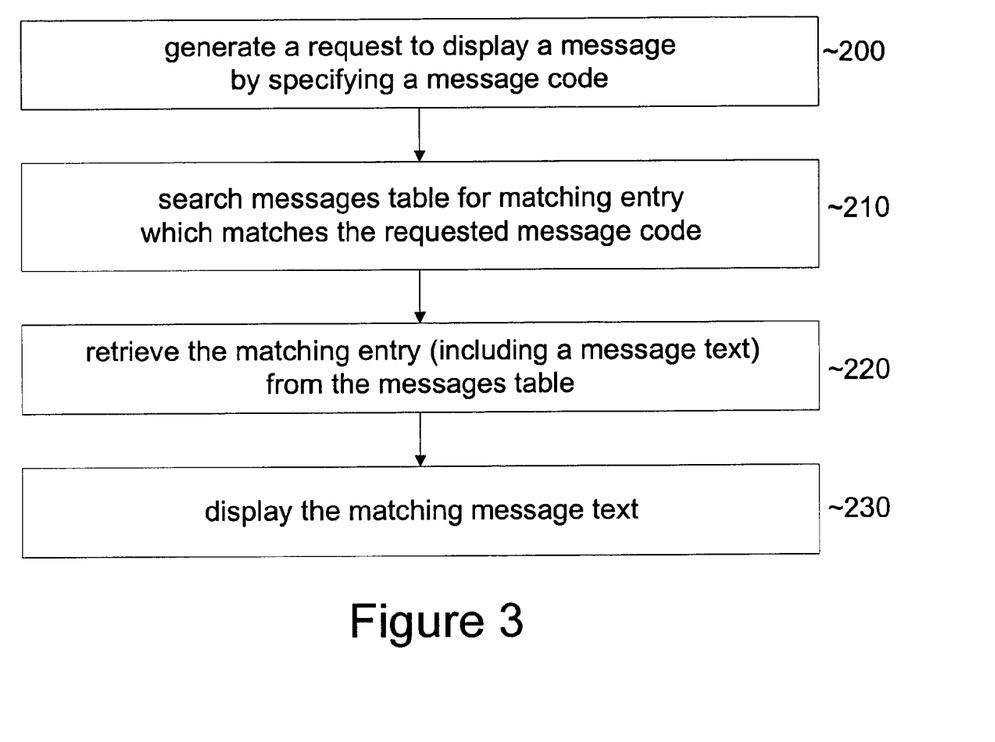
FIG. 3 is a flowchart illustrating a method of using a messages table associated with processing an insurance claim according to one embodiment.

In one embodiment, a message may be defined by a message code and a corresponding message text and both the message code as well as the message text stored in a message table. In another embodiment, as shown in FIG. 3, the message code may further include a message section 300 and a message code identifier 310. The combination of a specific message section and a specific message code identifier uniquely specifies or selects the message text 320 from the message table.

The initial configuration may include specifying or selecting a country and/or a language for the installation. In one embodiment, the selection of a language and/or a country may automatically select a corresponding message text stored in a database. In another embodiment, the user may modify the message text during the installation process.

In step 110, the application program software executing in the insurance claims processing system 10 may initiate a request to display a message. This may be in response to the execution of code in another portion of the application program software, or in response to a previous user input and/or in response to the execution of a business rule.

In step 120, the request to retrieve message text is processed further. In one embodiment, the request may be further processed by another portion of the application program software by invoking the GetMessageText method of the Message object, and including values for MsgSectionIn and MsgCodeIn arguments associated with the GetMessageText method. In another embodiment, the processing of the request may include executing software of a subroutine function to retrieve a corresponding message text for a given message code passed along by the requesting program as an input. The message text may be retrieved from a database, in one embodiment or from an object repository in another embodiment.

In step 130, the message text corresponding to a specified message code is received from step 120. In step 140, the requested message text is sent to the requesting program for display.

FIG. 3: Using a Messages Table for an Insurance Claim Processing System

FIG. 3 is a flowchart illustrating a method of using a messages table associated with processing an insurance claim according to one embodiment. In step 200, an insurance claims processing program may generate a request to display a message, wherein the request may include a requested message code. Each message code may include a sequence of alphanumeric values, wherein each sequence is unique relative to the other sequences. In one embodiment, each message code may include a message section and a message code identifier, as further illustrated in FIG. 4.

In step 210, a messages table in a database may be searched for a matching entry which matches the requested message code. The table may store a plurality of entries including the matching entry, wherein each entry in the table may include a message code and a corresponding message text. The database may be implemented, for example, as a relational database or an object-oriented database.

In step 220, the matching entry may be retrieved from the table in response to said searching the table for the matching entry which matches the requested message code, wherein the matching entry comprises a matching message text.

In step 230, the matching message text corresponding to the requested message code may be displayed by the insurance claims processing program on a display device coupled to a computer system. The message text may be configured to assist a user in processing an insurance claim using the insurance claims processing program.

In various embodiments, the message text of each entry in the table may be specified during an installation of the insurance claims processing program on a computer system and/or during an installation of the table on a computer system. The message text of each entry in the table in the database may be updated by re-installing the table on the computer system without re-installing the insurance claims processing program on the computer system. The message text of one or more entries in the table may be customized for a particular insurance organization during an installation of the insurance claims processing program on a computer system. Additionally, the message text of one or more entries in the table may be localized for use in a particular geographical location.

In one embodiment, the insurance claim may include a bodily injury claim, and processing the insurance claim may include processing the bodily injury claim to estimate a bodily injury general damages value. The requested message text may include information relevant to an estimate of a value of the insurance claim. The requested message code may include an injury code which identifies a specific bodily injury, and the requested message text may include a name of the specific bodily injury. The requested message code may include a treatment code which identifies a specific injury treatment, and the requested message text may include a name of the specific injury treatment.

Figure 4:
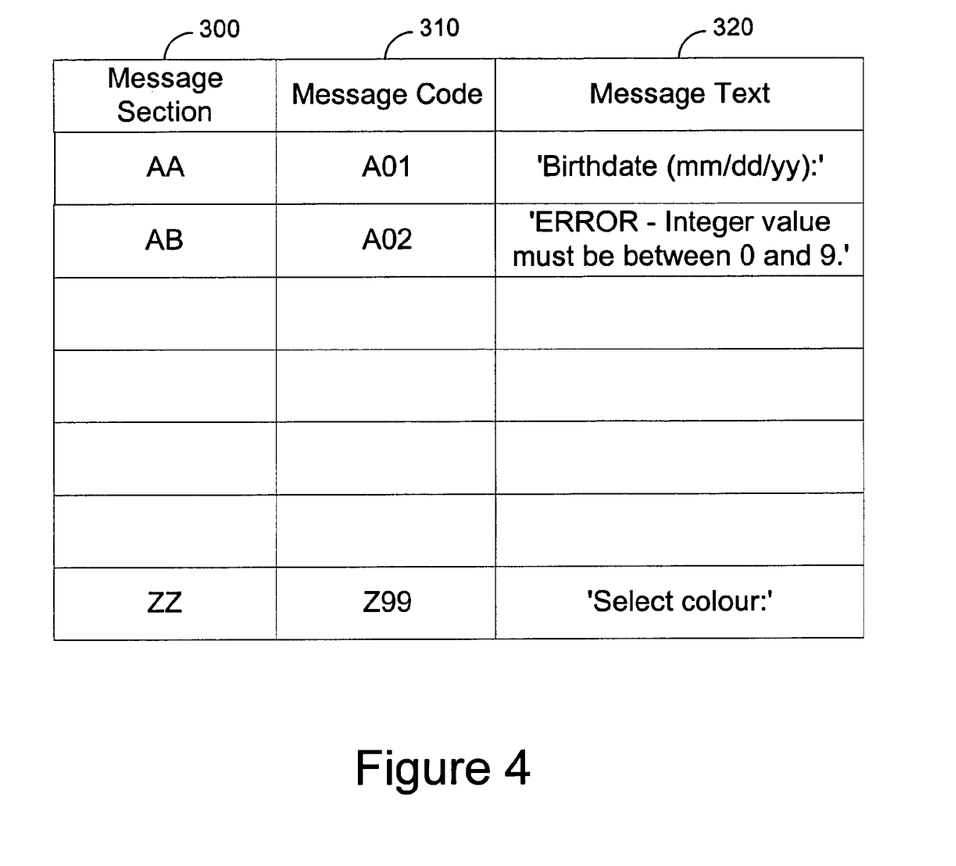
FIG. 4 is an exemplary diagram of a messages table in a database according to one embodiment.

FIG. 4: An Example of a Messages Table

FIG. 4 is an exemplary diagram of a messages table in a database according to one embodiment. In one embodiment, the messages table may include columns such as message section 300, message code identifier 310, and message text 320. In one embodiment, the messages table may be implemented in any number of ways, such as a relational database, in a variety of commercially available database management systems. The messages table may have as many rows as may be supported by the database management system in which it is implemented. The messages table may be accessed (e.g., searched, written to, read from, etc.) through a programming interface or standard access mechanism (e.g., SQL) which is supported by the database management system in which the messages table is implemented.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of processing a bodily injury insurance claim comprising:
    providing a database, each entry in the database comprising a message code and a corresponding message text;
    customizing the message text of at least one of the entries for a particular insurance company during an installation of an insurance claims processing program on a computer system, wherein said customizing the message text comprises modifying the message text of the at least one entry during the installation;
    sending an insurance claim to the insurance claims processing program, wherein the insurance claims processing program:
        automatically generates one or more processing steps in response to the insurance claim,
        automatically displays one or more processing steps to a user;
        automatically generates a request to display a message to the user based on the displayed processing steps, wherein the request comprises a requested message code;
        automatically searches the database for a matching entry which matches the requested message code, wherein the database stores a plurality of entries including the matching entry;
        automatically retrieves the matching entry from the database in response to said searching the database for the matching entry which matches the requested message code, wherein the matching entry comprises a matching message text;
        automatically displays the matching message text corresponding to the requested message code to the user along with one or more of the displayed processing steps, wherein the message text is configured to assist the user in processing the insurance claim using the insurance claims processing program;
        receives input from the user relating to the insurance claim;
        automatically estimates a bodily injury general damages value of the insurance claim based on input from the user, wherein the insurance claim comprises a bodily injury claim; and
        displays the estimated value to the user.

2. The method of claim 1, further comprising:
    specifying the message text of each entry in the database during an installation of the insurance claims processing program on a computer system.

3. The method of claim 2, wherein said specifying the message text of each entry in the database comprises modifying the message text of at least one of the entries in the database during the installation of the insurance claims processing program on the computer system.

4. The method of claim 1, further comprising:
    specifying the message text of each entry in the database during an installation of the database on a computer system.

5. The method of claim 4, further comprising:
    updating the message text of each entry in the database by re-installing the database on the computer system without re-installing the insurance claims processing program on the computer system.

6. The method of claim 1,
    wherein the message text of one or more entries in the database is localized for use in a particular geographical location.

7. The method of claim 1,
    wherein the database comprises a relational database.

8. The method of claim 1,
    wherein the database comprises an object-oriented database.

9. The method of claim 1,
    wherein each message code comprises a message section and a message code identifier.

10. The method of claim 1,
    wherein the requested message text comprises information relevant to an estimate of a value of the insurance claim.

11. The method of claim 1,
    wherein the requested message code comprises an injury code which identifies a specific bodily injury, and wherein the requested message text comprises a name of the specific bodily injury.

12. The method of claim 1,
    wherein the requested message code comprises a treatment code which identifies a specific injury treatment, and wherein the requested message text comprises a name of the specific injury treatment.

13. The method of claim 12, further comprising estimating a bodily injury general damages value based at least in part on the specific injury treatment.

14. The method of claim 1,
    wherein said displaying the matching message text corresponding to the requested message code comprises the insurance claims processing program displaying the matching message text corresponding to the requested message code.

15. The method of claim 1,
    wherein said displaying the matching message text corresponding to the requested message code comprises displaying the matching message text on a display device coupled to a computer system.

16. The method of claim 1,
    wherein each message code comprises a sequence of alphanumeric values, wherein each sequence is unique relative to the other sequences.

17. The method of claim 1, wherein the matching message text warns a user of the insurance claims processing program of an out of range input value.

18. The method of claim 1, further comprising modifying at least one processing step of the insurance claim processing program in response to said displaying of the matching message text.

19. A system comprising:
    a CPU;
    a memory coupled to the CPU, wherein the memory stores an insurance claims processing program which is executable by the CPU;
    a display device coupled to the CPU;
    a database coupled to the CPU, wherein the database stores a plurality of entries, wherein each entry in the database comprises a message code and a corresponding message text;
    wherein the memory stores program instructions which are executable by the CPU to:

customize the message text of at least one entry in the database during an installation of the insurance claims processing program on a computer system, wherein said customizing the message text comprises modifying the message text of the at least one entry during the installation;
receive an insurance claim;
automatically generate one or more processing steps in response to the insurance claim;
automatically display one or more processing steps to the user on the display device;
automatically generate a request to display a message to the user based on the displayed processing steps, wherein the request comprises a requested message code;
automatically search the database for a matching entry which matches the requested message code;
automatically retrieve the matching entry from the database, wherein the matching entry comprises a matching message text;
automatically display the matching message text corresponding to the requested message code to the user on the display device along with one or more of the displayed processing steps, wherein the message text is configured to assist a user in processing the insurance claim using the insurance claims processing program; and
receive input from the user relating to the insurance claim;
automatically estimate a bodily injury general damages value of the insurance claim based on the input from the user using the insurance claim processing program, wherein the insurance claim comprises a bodily injury claim; and
display the estimated value to the user.

20. The system of claim 19,
wherein the message text of each entry in the database is configured to be specified during an installation of the insurance claims processing program.

21. The system of claim 19,
wherein the message text of each entry in the database is configured to be specified during an installation of the database.

22. The system of claim 21,
wherein the message text of each entry in the database is configured to be updated by re-installing the database on the computer system without re-installing the insurance claims processing program.

23. The system of claim 19,
wherein the message text of at least one of the entries in the database is customized for use by a particular insurance organization.

24. The system of claim 19,
wherein the message text of one or more entries in the database is localized for use in a particular geographical location.

25. The system of claim 19,
wherein the database comprises a relational database.

26. The system of claim 19,
wherein the database comprises an object-oriented database.

27. The system of claim 19,
wherein each message code comprises a message section and a message code identifier.

28. The system of claim 19,
wherein the requested message text comprises information relevant to an estimate of a value of the insurance claim.

29. The system of claim 19,
wherein the requested message code comprises an injury code which identifies a specific bodily injury, and wherein the requested message text comprises a name of the specific bodily injury.

30. The system of claim 19,
wherein the requested message code comprises a treatment code which identifies a specific injury treatment, and wherein the requested message text comprises a name of the specific injury treatment.

31. The system of claim 19,
wherein each message code comprises a sequence of alphanumeric values, wherein each sequence is unique relative to the other sequences.

32. A computer-readable medium comprising program instructions, wherein the program instructions are executable by a computer system to implement a method of:
customizing the message text of at least one of the entry in a database for a particular insurance company during an installation of an insurance claims processing program on a computer system; wherein each entry in the database comprises a message code and a corresponding message text; wherein said customizing the message text comprises modifying the message text of the at least one entry during the installation;
sending an insurance claim to the insurance claim processing program, wherein the insurance claim processing program:
automatically generates one or more processing steps in response to the insurance claim;
automatically displays one or more processing steps to a user;
automatically generates a request to display a message to the user based on the displayed processing steps, wherein the request comprises a requested message code;
automatically searches a database for a matching entry which matches the requested message code, wherein the database stores a plurality of entries including the matching entry, wherein each entry in the database comprises a message code and a corresponding message text;
automatically retrieves the matching entry from the database in response to said searching the database for the matching entry which matches the requested message code, wherein the matching entry comprises a matching message text;
automatically displays the matching message text corresponding to the requested message code to the user along with one or more of the displayed processing steps, wherein the message text is configured to assist a user in processing the insurance claim using an insurance claims processing program;
receives input from the user relating to the insurance claim;
automatically estimates a bodily injury general damages value of the insurance claim based on input from the user using the insurance claim processing program, wherein the insurance claim comprises a bodily injury claim; and
displays the estimated value to the user.

33. The carrier medium of claim 32,
wherein the message text of each entry in the database is configured to be specified during an installation of the insurance claims processing program.

34. The carrier medium of claim 32,
wherein the message text of each entry in the database is configured to be specified during an installation of the database.

35. The carrier medium of claim 34,
wherein the message text of each entry in the database is configured to be updated by re-installing the database on the computer system without re-installing the insurance claims processing program.

36. The carrier medium of claim 32,
wherein the message text of at least one of the entries in the database is customized for use by a particular insurance organization.

37. The carrier medium of claim 32,
wherein the message text of one or more entries in the database is localized for use in a particular geographical location.

38. The carrier medium of claim 32,
wherein the database comprises a relational database.

39. The carrier medium of claim 32,
wherein the database comprises an object-oriented database.

40. The carrier medium of claim 32,
wherein each message code comprises a message section and a message code identifier.

41. The carrier medium of claim 32,
wherein the requested message text comprises information relevant to an estimate of a value of the insurance claim.

42. The carrier medium of claim 32,
wherein the requested message code comprises an injury code which identifies a specific bodily injury, and wherein the requested message text comprises a name of the specific bodily injury.

43. The carrier medium of claim 32,
wherein the requested message code comprises a treatment code which identifies a specific injury treatment, and wherein the requested message text comprises a name of the specific injury treatment.

44. The carrier medium of claim 32,
wherein said displaying the matching message text corresponding to the requested message code comprises the insurance claims processing program displaying the matching message text corresponding to the requested message code.

45. The carrier medium of claim 32,
wherein said displaying the matching message text corresponding to the requested message code comprises displaying the matching message text on a display device coupled to a computer system.

46. The carrier medium of claim 32,
wherein each message code comprises a sequence of alphanumeric values, wherein each sequence is unique relative to the other sequences.

* * * * *